United States Patent Office 2,835,702
Patented May 20, 1958

2,835,702

BENZENE 1,3 DISULFONAMIDES POSSESSING DIURETIC PROPERTIES

Everett M. Schultz, Ambler, Pa., assignor to Merck & Co., Inc., Rahway, N. J., a corporation of New Jersey No Drawing. Application May 2, 1956
Serial No. 582,072

7 Claims. (Cl. 260—556)

This invention comprises novel 4-chloro-5-halobenzene-1,3-disulfonamide compounds having the following structural formula

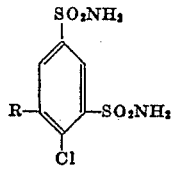

and alkali metal salts thereof wherein R is the chlorine or bromine atom.

The new compounds of this invention are useful chemotherapeutic agents particularly because of their diuretic and/or natriuretic properties. The compounds can be administered in therapeutic dosages in conventional vehicles as in the form of a tablet as these compounds are effective upon oral administration as well as upon injection. As the alkali metal salts of the compounds of this invention are also readily soluble in an isotonic aqueous medium, injectable solutions can be prepared by dissolving the compounds in the selected medium to which preservatives can be added if desired.

The dosage of the 4-chlorobenzene-1,3-disulfonamide compounds of this invention will vary over a wide range and for this reason, scored tablets containing 100, 150, 250 and 500 mgms. of the active ingredient can be made available to the physician for the symptomatic adjustment of the dosage to the individual patient. These dosages are well below the toxic or lethal dose of the compound covered by this invention. Chronic toxicity studies in dogs using 4,5-dichlorobenzene-1,3-disulfonamide demonstrate that 20 milligrams per kilogram per day were well tolerated over a long period of time without any untoward toxic manifestations. In mice the $LD_{50}$ was found to be 703 milligrams per kilogram intravenously and 1,710 milligrams per kilogram orally.

The 4-chloro-5-halobenzene-1,3-disulfonamide compounds of this invention are readily prepared by heating an ortho-halophenol with chlorosulfonic acid. The 5-halo-4-hydroxybenzene-1,3-disulfonyl chloride thus obtained then is heated with phosphorus pentachloride to form the corresponding 4-chloro-5-halobenzene-1,3-disulfonyl chloride which is reacted with ammonia to form the desired 4-chloro-5-halobenzene-1,3-disulfonamide. Advantageously, 2.5 moles of phosphorus pentachloride are used per mole of disulfonyl chloride.

The alkali metal salts of the 4-chloro-5-halobenzene-1,3-disulfonamide compounds of this invention can be prepared by dissolving the selected compound in an aqueous or alcoholic solution of the selected alkali metal hydroxide, and if desired, isolating the salt by evaporating the solvent. Any of the conventional alkali metal salts, such as the sodium, potassium, lithium or the like salts, can be prepared by this method or by other methods known to organic chemists.

The preparation of these compounds is more fully described in the following examples. It is to be understood, however, that the examples are illustrative of the methods employed for their preparation and are not to be construed as limiting the invention to the particular reaction conditions specifically described.

*Example 1.—4,5-dichlorobenzene-1,3-disulfonamide*

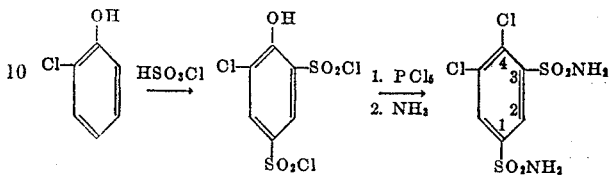

In a 2-liter round-bottomed flask equipped with stirrer and dropping funnel is placed 1585 g. (880 cc.; 13.6 moles) of chlorosulfonic acid. To this is added dropwise with stirring during 5 hours 218 g. (1.7 moles) of o-chlorophenol. The mixture is allowed to stand 1 hour at room temperature and then is heated 1 hour on a steam bath. The mixture is then poured on ice. A product consisting largely of 5-chloro-4-hydroxybenzene-1,3-disulfonyl chloride separates as a gum which solidifies on standing for about 1 hour. The solid product is collected on a Buchner funnel, washed with water and thoroughly dried in air at room temperature.

A mixture of this crude product (approximately 302 g., 0.92 mole) and 480 g. (2.3 moles) of phosphorus pentachloride is heated for 1 hour at 120–140° in a 2-liter round-bottomed flask. The resulting clear solution is poured on ice. 4,5-dichlorobenzene-1,3-disulfonyl chloride separates immediately as a solid. It is collected by filtration and washed with water. While still moist, it is added in portions during about 20 minutes to 1 liter of concentrated ammonia water contained in a 3-liter beaker surrounded by a cold water bath. The reaction mixture is then allowed to stand for 1 hour without cooling after which it is heated on a steam bath for about 30 minutes while air is bubbled through it, in order to remove some of the excess ammonia. It is then filtered, acidified with concentrated hydrochloric acid and chilled. The product separates as a gum from which the supernatant liquid is decanted, and the gum is triturated with 250 cc. of water in order to induce crystallization. The crude product thus obtained is recrystallized from 3200 cc. of boiling water and then from 40% aqueous isopropyl alcohol yielding 4,5-dichlorobenzene-1,3-disulfonamide as a white solid, M. P. 228.5–229.0° C.

*Example 2.—5-bromo-4-chlorobenzene-1,3-disulfonamide*

By replacing the o-chlorophenol employed in Example 1 by an equimolecular quantity of o-bromophenol and following substantially the same procedure described in Example 1, there is obtained 5-bromo-4-chlorobenzene-1,3-disulfonamide.

*Example 3.—Compressed tablet containing 250 mgs. of active ingredient per tablet*

|  | Gms. |
|---|---|
| 4,5-dichlorobenzene-1,3-disulfonamide | 12.500 |
| Calcium phosphate tri-basic | 2.095 |
| Methyl cellulose, 15 c. p. s. 2%, 3 cc. | 0.060 |
| Starch paste 10%, one part; gelatin solution 20%, one part, 3 cc. | 0.450 |
|  | 15.105 |
| Methyl cellulose 15 c. p. s. | 0.750 |
| Talc, dried | 0.750 |
|  | 16.605 |

4,5-dichlorobenzene-1,3-disulfonamide and calcium phosphate tri-basic are mixed together and then passed two times through No. 60 bolting cloth. Methyl cellulose solution then is added and thoroughly mixed in the granulation and the mixture then passed through a No. 10 screen. The starch-gelatin solution then is added to the granulation, thoroughly mixed, and passed through a No. 10 screen after which the total granulation is oven dried at between about 120–130° F. for 16–18 hours, and passed through a No. 18 screen. The methyl cellulose is passed through a No. 60 bolting cloth onto this granulation and blended thoroughly therewith after which the talc is passed through a No. 60 bolting cloth and also thoroughly mixed with the granulation. The resulting granulation is compressed into tablets using a 13/32" standard curvature punch yielding 50 tablets having a thickness of 0.155 to 0.160", 10 of which weigh 3.321 gms. The tablets have a hardness of 5–6 kilograms measured by the Monsanto Chemical Company tablet hardness tester apparatus, and a disintegration time of 12 minutes when tested by the U. S. P. tablet disintegrating apparatus (U. S. Pharmacopoeia, 15th edition, page 937).

While the above examples described the preparation of certain specific compounds and a certain specific dosage form suitable for administering the novel compound of this invention in human therapy, it is to be understood that the invention is not to be limited by these examples or by the specific reaction conditions described for the preparation of the compounds or by the specific ingredients included in the pharmaceutical preparation, but is understood to embrace variations and modifications falling within the scope of the appended claims.

What is claimed is:

1. A 4-chloro-5-halobenzene-1,3-disulfonamide selected from the group consisting of compounds having the general structural formula

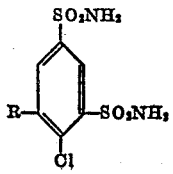

and non-toxic alkali metal salts thereof wherein R is selected from the group consisting of chlorine and bromine atoms.

2. 4,5-dichlorobenzene-1,3-disulfonamide.

3. 5-bromo-4-chlorobenzene-1,3-disulfonamide.

4. A pharmaceutical composition comprising as its essential active ingredient a compound selected from the class consisting of 4,5-dichlorobenzene-1,3-disulfonamide and non-toxic alkali metal salts thereof.

5. A pharmaceutical composition comprising as its essential active ingredient a compound selected from the class consisting of 5-bromo-4-chlorobenzene-1,3-disulfonamide and non-toxic alkali metal salts thereof.

6. A compressed tablet comprising as its essential active ingredient 4,5-dichlorobenzene-1,3-disulfonamide.

7. In a process for preparing a 4-chloro-5-halobenzene-1,3-disulfonamide the steps comprising heating a 5-halo-4-hydroxybenzene-1,3-disulfonyl chloride with phosphorus pentachloride to form the corresponding 4-chloro-5-halobenzene-1,3-disulfonyl chloride which by known methods is converted to the corresponding 4-chloro-5-halobenzene-1,3-disulfonamide wherein the 5-halo substituent is selected from the group consisting of the chlorine and bromine atoms.

References Cited in the file of this patent
UNITED STATES PATENTS

| | | |
|---|---|---|
| 2,165,484 | Huismann | July 11, 1939 |
| 2,929,997 | Hentrich et al. | Aug. 11, 1942 |

OTHER REFERENCES

Gebauer-Fulnegg et al.: Monashefte fur Chemie 48,635. (Beilsteins Hand., vol. 11, Zweites Ergans. (1950), p. 113).

Davies et al.: J. Chem. Soc. 1927, 1122.